United States Patent [19]

Nurczyk et al.

[11] Patent Number: 4,838,483

[45] Date of Patent: Jun. 13, 1989

[54] VAV VALVE CONTROL WITH TRANSDUCER TOLERANCE COMPENSATION

[75] Inventors: Mark E. Nurczyk, Eastman; Tedd P. Johnson, La Crosse, both of Wis.

[73] Assignee: American Standard Inc., New York, N.Y.

[21] Appl. No.: 179,790

[22] Filed: Apr. 11, 1988

[51] Int. Cl.$^4$ ............................................... F24F 7/00
[52] U.S. Cl. ......................................... 236/49.5; 73/3; 236/94
[58] Field of Search ............. 236/49 D, 94; 165/11 R; 364/510; 73/3

[56] References Cited

U.S. PATENT DOCUMENTS

| | | | |
|---|---|---|---|
| 4,553,696 | 11/1985 | Ichikawa et al. | 236/49 D |
| 4,591,093 | 5/1986 | Elliott, Jr. | 236/94 |
| 4,646,964 | 3/1987 | Parker et al. | 236/94 X |
| 4,671,097 | 6/1987 | Kurki et al. | 364/510 X |

Primary Examiner—William E. Wayner
Attorney, Agent, or Firm—William J. Beres; David L. Polsley; Robert J. Harter

[57] ABSTRACT

The variable opening of a pressure independent supply air valve for a building ventilation system is controlled in response to a standard airflow transducer whose output is modified to emulate a close tolerance transducer. In a calibration mode, a microcomputer based control closes the valve and a summing amplifier reduces the transducer output by an amount equal to a compensation signal provided by the microcomputer. Once the output is reduced to a predetermined desired level, the value of the compensation signal is stored in memory for later use during a run mode. In the run mode, the actual supply airflow rate is determined based upon the transducer output less the compensation signal. And the control adjusts the position of the valve until the actual airflow rate meets a desired airflow rate as determined by a room thermostat.

23 Claims, 5 Drawing Sheets

VAV VALVE CONTROL WITH TRANSDUCER TOLERANCE COMPENSATION

TECHNICAL FIELD

The subject invention generally pertains to variable air volume (VAV) valves used in ventilation systems, and more specifically pertains to a control that modulates the position of a VAV valve in response to feedback from a thermostat and a flow sensor.

BACKGROUND OF THE INVENTION

One way of controlling the temperature of a comfort zone, such as a room in a building, is to control the flow rate of heated (or cooled) air supplied to the room. This can be accomplished by controlling the position of a supply air valve in response to an airflow sensor and a thermostat. The effectiveness of such an approach, however, can vary from one system to the next due to tolerance variations of the specific flow sensor being used.

A typical flow sensor provides an output voltage having an amplitude that varies as a function of airflow rate. The output of the sensor has a nominal null corresponding to zero flow and a nominal span corresponding to the expected range over which the output can vary as the flow rate varies from zero to full flow. Both the null and the span have a tolerance specified by the manufacturer of the sensor. Although some tolerance may be acceptable in some applications, it often causes serious control problems in the regulation of supply airflow to a comfort zone, especially at low airflow rates.

A flow sensor that senses airflow by sensing static and stagnation pressures (e.g. a Pitot tube in conjunction with a pressure-voltage transducer) typically provides an output voltage that has an exponential, rather than linear relationship with the rate of airflow. Problems arise at low airflow rates, because large changes in flow rate cause only small changes in output voltage. As a result, sensors having slightly different null values will generate significantly different voltage outputs at low flow rates.

Another problem with sensors having different null and span values is that the circuit receiving the sensor's output, typically an A/D converter, must be capable of receiving a wide range of signals. The range of the receiving circuit must be low enough to accept low airflow signals from sensors having a relatively small null value, and the range must be high enough for high airflow signals generated by sensors with a relatively high null and large span. As a result, any one particular sensor will use only a portion of the receiving circuit's full range. This means that the resolution will be less than optimum. Resolution, in a broad sense, is defined as the change in the receiving circuit's output for a given change in sensor output. Low resolution is especially detrimental at low airflow rates where a large change in airflow only causes a small change in sensor output.

Therefore, it is an object of the invention to provide a control for an air valve that compensates for the different characteristics of various airflow sensors without sacrificing resolution.

Another object of the invention is to adjust a flow sensor's output before it is delivered to a microcomputer's A/D converter so that various outputs from different sensors will closely fit within the range of the A/D converter.

A further object of the invention is to identify a valve or sensor malfunction by driving an air valve to a closed position and comparing the airflow sensor's output to a predetermined acceptable range.

A still further object of one embodiment of the invention is to accurately sense a flow sensor's null point by actually driving an air valve to a closed position rather than simulating a closed position by isolating the sensor from the airflow.

Yet another object of the invention is to provide high and low range look-up tables to represent the non-linear relationship between airflow and the flow sensor's output voltage and to provide a higher resolution during low flow rates.

These and other objects of the invention will be apparent from the attached drawings and the following description of the preferred embodiment.

SUMMARY OF THE INVENTION

The subject invention is a microcomputer based control for a variable position air valve disposed in a supply air duct. In a calibration mode, the control derives a reference number having a value based on an airflow sensor's output that is generated when the valve is closed. In a run mode, the control modulates the position of the valve in response to a thermostat, a flow sensor, and the reference number that was derived during the calibration mode.

DESCRIPTION OF THE PREFERRED EMBODIMENT

Figure 1:
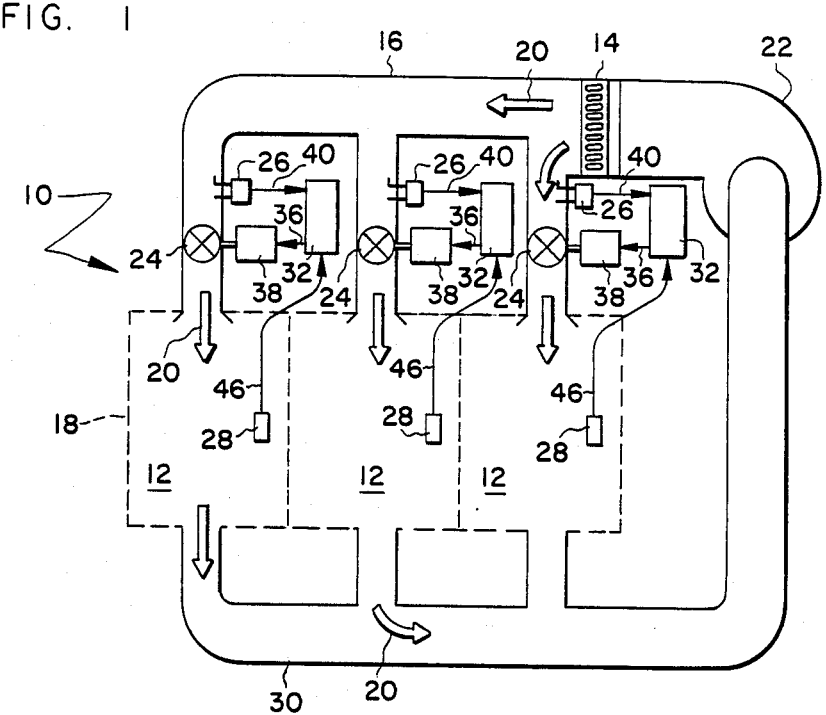
FIG. 1 shows a variable air volume system incorporating the subject invention.

FIG. 1 shows a temperature conditioning system 10 employing the subject invention. System 10 controls the temperature of several zones 12 within a building 18 by regulating the rate of temperature conditioned air 20 supplied to each zone 12. Such a system is generally referred to in the industry as a VAV (variable air volume) system.

A variable capacity blower 22 discharges air 20 at a flow rate that meets the total airflow demand of all the zones 12 being served by the system. The supply air passes through a heat exchanger 14 that, depending on the need, either heats or cools air 20 before it reaches valves 24 by way of a supply air duct network 16. Each valve 24 regulates the rate of airflow to its respective zone 12 in response to a flow sensor 26 and a temperature sensor 28 associated with the zone. Air 20 then leaves each zone 12 through a return air duct 30 that conveys air 20 back to blower 22 for recirculation through system 10.

Figure 2:
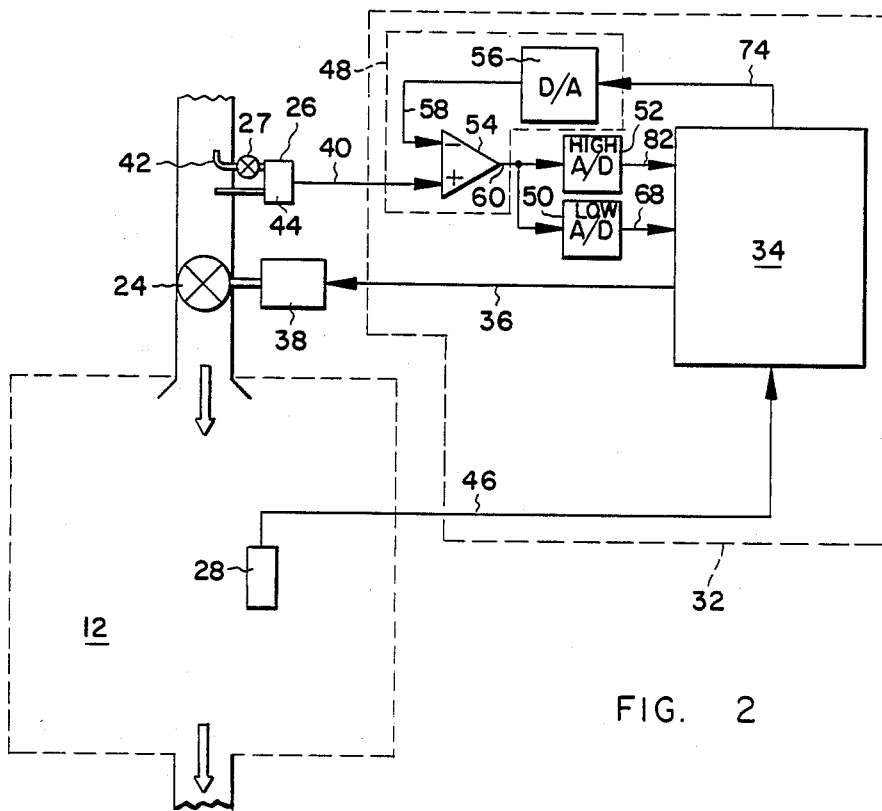
FIG. 2 shows a schematic diagram of a control for a variable position supply air valve.
Figure 7:
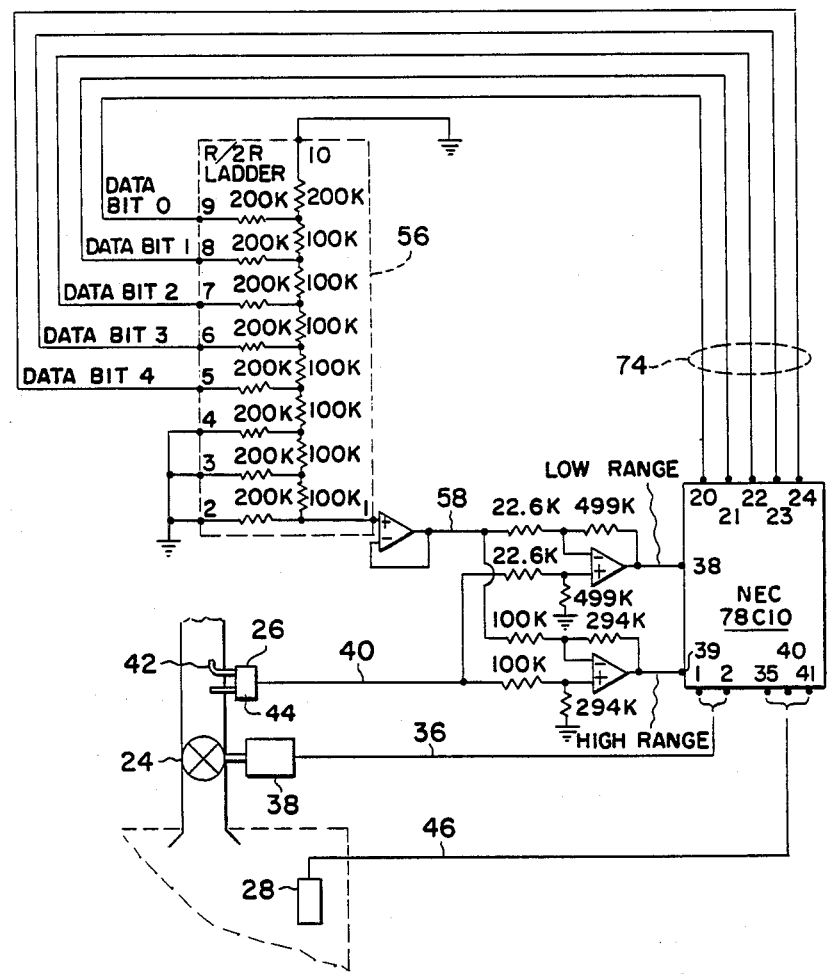
FIG. 7 shows further detail of the control shown in FIG. 2.

Each valve 24 operates separately to serve its respective zone 12. A more detailed view of valve 24 and its control 32 is shown in FIG. 2, and further detail is shown in FIG. 7. Referring to FIG. 2, a microcomputer 34 provides a drive signal 36 that controls the position of valve 24 in response to the airflow rate of air 20 and the zone temperature as sensed by a flow sensor 26 and temperature sensor 28 respectively.

Drive signal 36 is delivered to a valve drive 38 that positions valve 24 to various degrees of opening. Valve drive 38 represents any device that can vary the position of valve 24, such as an electric motor coupled to valve 24 by way of a lead screw (not shown). Microcomputer 34 can determine the position of valve 24 by measuring the time the valve is driven in an open or closed direction, and comparing that time to the predeterined time it takes the valve to move between fully open and fully closed. The current valve position can then be determined by adding the change in position to the valve's previous position, and a starting position of fully closed can be determined by driving the valve in a closed direction for a period appreciably longer than the predetermined time it takes the valve to move between fully open and fully closed. The position of valve 24 is adjusted so that the actual rate of airflow through valve 24, as measured by flow sensor 26, equals the desired rate of airflow as determined by the temperature sensor 28.

Flow sensor 26 comprises a Pitot tube device 42 and a pressure to voltage transducer 44. Pitot tube 42 determines the velocity pressure by sensing the difference between the dynamic and static pressures of airflow 20. Transducer 44 generates a transducer signal 40 having a voltage that increases with increasing airflow. It should be appreciated, however, that flow sensor 26 represents any sensor having the ability to provide a feedback signal that changes in response to a change in airflow. Other examples of sensor 26 would include but are not limited to turbine flow meters and heat dissipating flow sensors. Temperature sensor 28 represents any temperature responsive device that generates a temperature feedback signal 46 indicative of the temperature of zone 12, such as any conventional thermostat.

The specific transducer 44 used in the preferred embodiment of the invention has a nominal null transducer output of 0.25 volts with a tolerance range of 0.18 to 0.32 volts. In other words, at zero airflow through valve 24, transducer signal 40, of any one transducer 44, could be anywhere between 0.18 and 0.32 volts. To compensate for this wide tolerance, transducer signal 40 is first fed through a feedback compensation circuit 48 where signal 40 is conditioned before being delivered to the A/D converters 50 and 52 of microcomputer 34.

Figure 3:
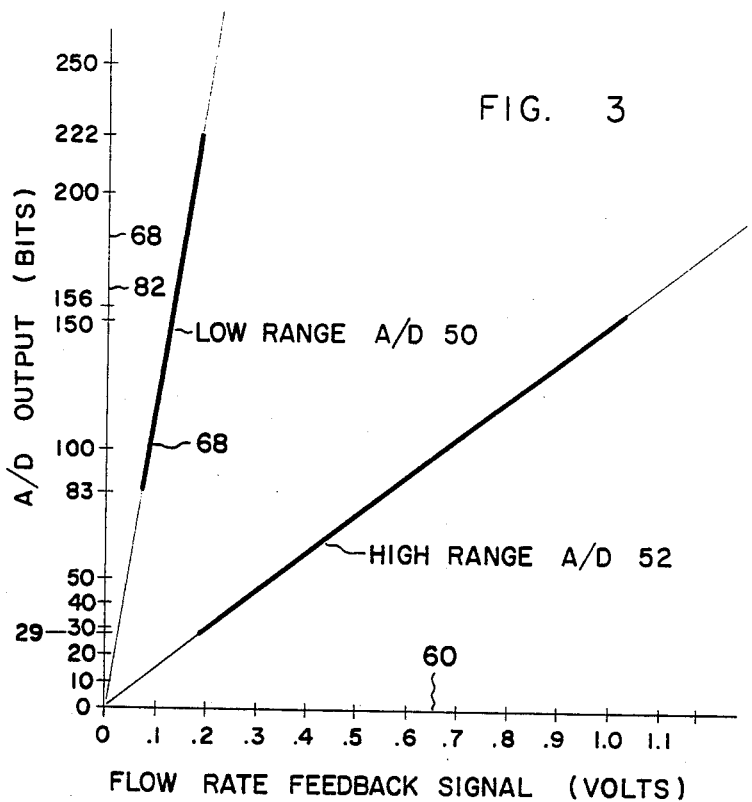
FIG. 3 shows how the digital output of two A/D converters vary as a function of their analog input.
Figure 4:
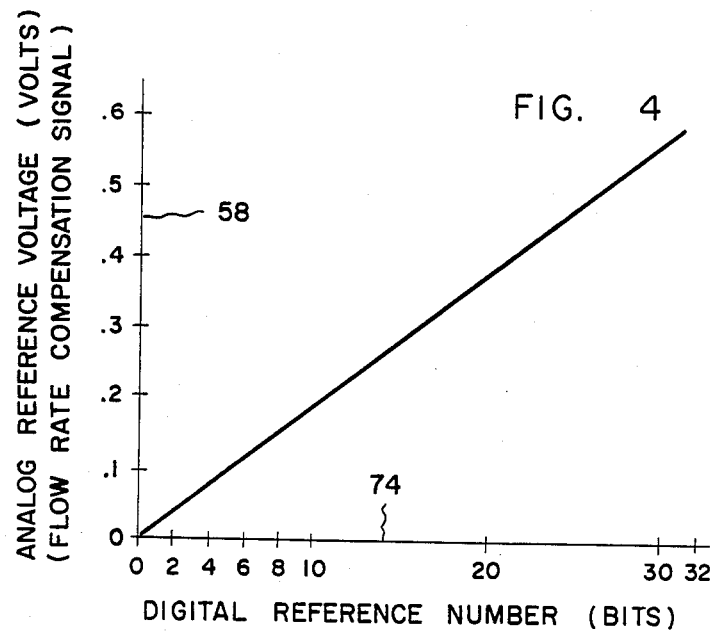
FIG. 4 shows how the analog output of a D/A converter varies as a function of its digital input.

Compensation circuit 48 includes a summing amplifier 54 and a five-bit (32 increment) D/A converter 56. Summing amplifier 54 subtracts a flow rate compensation signal 58 (which will be explained later) from transducer signal 40 to produce a flow rate feedback signal 60. In other words, the DC analog voltage of signal 60 equals the voltage of signal 40 minus the voltage of signal 58. The analog to digital relationships of the A/D converters 50 and 52 are shown in FIG. 3, and the digital to analog relationship of the D/A converter 56 is shown in FIG. 4. A/D converters 50 and 52 are an integral part of microcomputer 34 which, in the preferred embodiment of the invention, is an NEC 78C10. It should be noted, however, that A/D converters 50 and 52 could be separate devices and the use of a variety of other microcomputers is well within the scope of the invention.

Valve control 32 operates in a calibration mode before entering a run mode. In the calibration mode, microcomputer 34 executes the calibration algorithm shown in FIG. 5. Control block 62 starts the calibration sequence by driving valve 24 to a predetermined position, such as fully closed, under the command of drive signal 36. As an alternative to closing valve 24, a small valve 27 disposed on Pitot tube 42 can be closed to isolate flow sensor 26 from the effects of airflow, thereby producing a constant transducer signal 40 during calibration. Decision blocks 64 and 66 determine whether a digital output 68 of A/D converter 50 lies within the range of 55 to 100 bits. The digital value, in bits, of the low range A/D converter 50 is defined by curve 68 of FIG. 3. In equation form, the low range A/D output 68 (in bits) equals the flow rate feedback signal 60 (in volts) times a gain constant of 1,130. However, for flow rate feedback signal 60 outside the range of approximately zero to 0.2 volts, the digital output 68 of A/D converter 50 is limited to zero and 255 bits respectively.

Depending on the digital output value of the low A/D converter 50, blocks 70 and 72 appropriately increment or decrement a digital reference number 74 (FIG. 4, abscissa), until output 68 of the low range A/D converter 50 lies within the desired range of 55 to 100 bits. If the control is unable to bring output 68 within 55 to 100 bits a valve or transducer malfunction is likely the problem.

Once within the desired range and after an appropriate delay for hardware response (block 76), the calibration mode is terminated and the current reference number 74 is stored in the microcomputer memory as indicated by blocks 78 and 80. In block 79, the low range A/D converter output 68 is stored, and the stored value is used later for computing the airflow rate during the run mode. The current reference number 74 and its related flow rate compensation signal 58 remain constant during the run mode.

Figure 6:
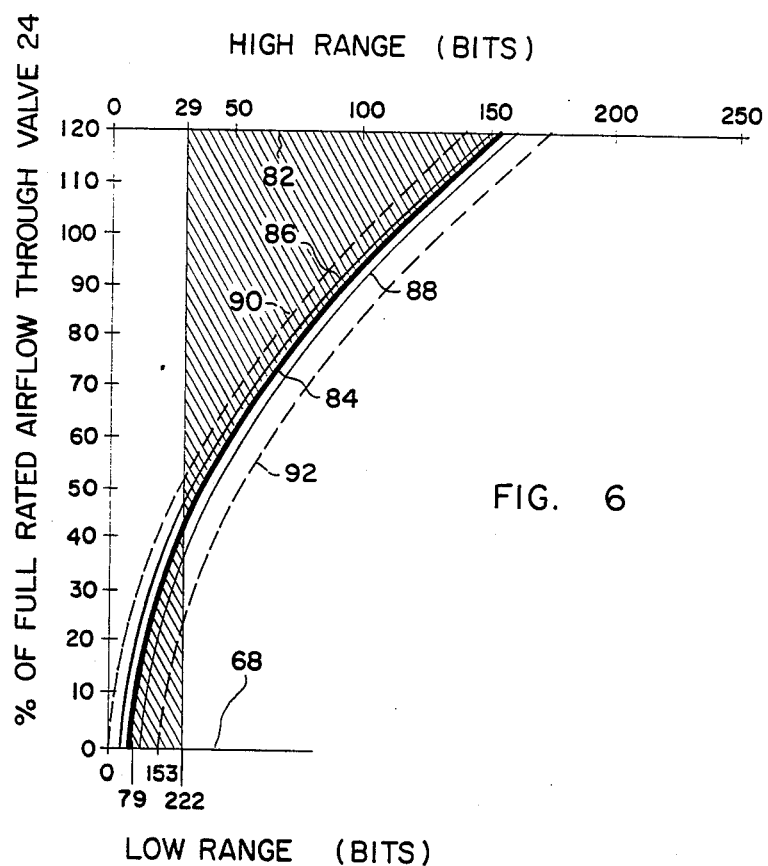
FIG. 6 shows how the digital ouput of two A/D converters vary as a function of airflow.

Upon completion of the calibration mode, the microcomputer based control 32 enters the run mode in which drive signal 36 controls the position of valve 24 in response to the temperature feedback signal 46 and the flow rate feedback signal 60. The two A/D converters 50 and 52 split the flow rate feedback signal 60 into a high and low range. Using two look-up tables corresponding to the two ranges, microcomputer 34 determines the actual airflow rates through valve 24 based upon output 68 on a low range A/D converter 50 when its digital ouput 68 is less than or equal to 222 bits, as shown in FIG. 6. Greater than 222 bits, the rate of airflow is based upon a digital output 82 of the high range A/D converter 52. Still referring to FIG. 6, the low range provides the needed high resolution at flow rates below 44% of the rated airflow, and the high range covers flow rates above 44%, where the low range 8-bit A/D converter 50 approaches an overflow condition, i.e., the output of A/D converter 50 approaches $2^8 = 256$ bits.

Curve 84 of FIG. 6 is defined by the following equations:

Low Range: % of Full Rated Airflow =

$$\text{High Range: \% of Full Rated Airflow} = 122.5\sqrt{\left(\frac{\text{BITS}}{1130}\right) - \left(\begin{array}{c}\text{Stored Value}\\\text{of Low A/D}\end{array}\right)}$$

$$122.5\sqrt{\left(\frac{\text{BITS}}{151}\right) - \left(\begin{array}{c}\text{Stored Value}\\\text{of Low A/D}\end{array}\right)}/7.5$$

Where BITS is the digital output 68 or 82 of the appropriate A/D converter 50 or 52, and the "stored value of low A/D" is the digital output value 68 of the low A/D converter 50 that was stored during the calibration mode. "Full rated airflow" is nominally the maximum continuous airflow rate recommended by the manufacturer of the specific valve being used.

In the preferred emboidment of the invention, look-up tables were used to represent the above equations as one method of avoiding the reiterative process of computing a square root function. Straight line approximations is another possible method. Curve 84 represents the airflow rates that will be computed when using a flow sensor 26 that provides a flow rate feedback signal 60 of 0.07 volts during the calibration mode. For example, a flow sensor 26 providing a null output 40 of 0.23 volts and a flow rate compesation signal 58 of 0.16 volts provides a zero flow rate feedback signal 60 of 0.07 volts and would generally follow curve 84 with some possible divergence due to the sensor's span tolerance. Another example would be a flow sensor 26 having a null output 40 of 0.30 volts and having a compensation signal 58 of 0.23 volts.

Figure 5:
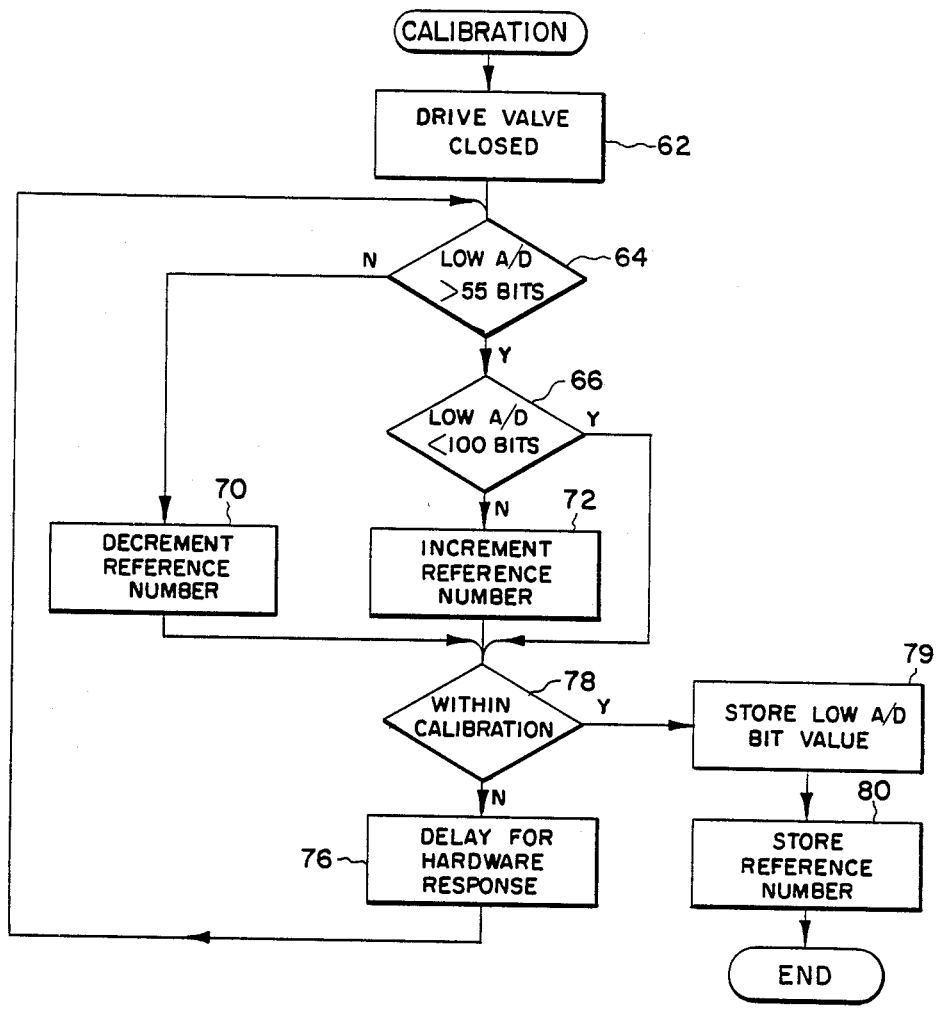
FIG. 5 is a calibration control algorithm for the subject invention.

It should be noted that with the 32 discrete incremental steps of the flow rate compensation signal 58 and an allowable range of 55 to 100 bits defined by blocks 64 and 66 of FIG. 5, actual flow sensors 26 will produce a flow rate curve that may lie generally anywhere between curves 86 and 88 of FIG. 6. If valve control 32 did not include the calibration mode, the null tolerance of the sensor used in the preferred embodiment could result in computed flow rates that would lie anywhere within curves 90 and 92. With such a broad range, a flow rate of 0 to 40% could produce the same flow rate feedback signal 68 corresponding to 153 bits in the low range.

It should also be clear that flow rate feedback signal 60 generally varies in discrete increments during the calibration mode due to flow rate compensation signal 58 changing in discrete increments. And in the run mode, signal 60 varies infinitely due to transducer signal 40 being a smoothly varying analog output.

Although the invention is described with respect to a preferred embodiment, modifications thereto will be apparent to those skilled in the art. Therefore, the scope of the invention is to be determined by reference to the claims which follow.

We claim:

1. An airflow control comprising:
   a variable position valve adapted to be connected to a supply air duct for regulating the flow rate of an airflow through said duct, said supply air duct being connected to convey said airflow to a comfort zone;
   a sensor that provides a transducer signal that varies as a function of the flow rate of said airflow;
   a temperature sensor that provides a temperature feedback signal that varies in response to a temperature associated with said comfort zone;
   a feedback compensation circuit generating a flow rate feedback signal in response to said transducer signal and a flow rate compensation signal;
   a microcomputer associated with a memory and being adapted to receive said temperature feedback signal and said flow rate feedback signal, said microcomputer being operative in a run mode and in a calibration mode, in said calibration mode, said sensor provides a substantially constant transducer signal and said memory stores a digital reference number having a value at least partially based upon said substantially constant transducer signal, and in said run mode, said microcomputer provides said flow rate compensation signal based upon said digital reference number and provides a drive signal that controls the position of said valve in response to said temperature feedback signal and said flow rate feedback signal.

2. The control of claim 1, wherein said flow rate compensation signal varies in said calibration mode but remains substantially constant in said run mode.

3. The control of claim 1, wherein said substantially constant transducer signal is produced as a result of said valve being in a predetermined position during said calibration mode.

4. The control of claim 3, wherein said microcomputer controls said valve to move to said predetermined position for calibration.

5. The control of claim 3, wherein said predetermined position is substantially closed to substantially block any airflow from passing through said valve.

6. The control of claim 1, wherein said substantially constant transducer signal is produced by isolating said sensor from the effects of said airflow.

7. The control of claim 1, wherein said sensor is responsive to static and dynamic pressures of said airflow.

8. The control of claim 1, wherein said feedback compensation circuit includes a D/A converter whose analog output provides said flow rate compensation signal.

9. The control of claim 1, wherein said compensation circuit includes a summing amplifier having an output that provides said flow rate feedback signal and having inputs connected to receive said transducer signal and said flow rate compensation signal.

10. The control of claim 1, wherein said microcomputer includes two A/D converters corresponding to predetermined high and low airflow rates, each of said A/D converters being connected to input said flow rate feedback signal to said microcomputer.

11. The control of claim 1, wherein said flow rate feedback signal generally varies in discrete increments during said calibration mode, and varies infinitely during said run mode.

12. A temperature conditioning system comprising:
    a variable capacity air blower;
    a supply air duct network connected to a discharge outlet of said blower for delivering a temperature conditioned airflow to a plurality of comfort zones;
    a heat exchanger in series flow relationship with said blower for temperature conditioning said airflow;
    a return air duct for conveying air from said comfort zones to a suction inlet of said blower;

a plurality of valves disposed in said supply air duct network for regulating the flow rate of said airflow to said comfort zones;

at least one temperature sensor for providing a temperature feedback signal in response to a temperature associated with at least one of said comfort zones;

a plurality of airflow sensors corresponding to said plurality of valves for sensing an airflow rate through each of said valves, each of said sensors generating a transducer signal that varies in response to said airflow rate;

a microcomputer associated with at least one of said valves and its corresponding airflow sensor, said microcomputer being further associated with a memory for storing a digital reference number having a value that is at least partially based upon a transducer signal generated by said one valve's corresponding airflow sensor when said one valve is in a predetermined position, said microcomputer being operative to provide a flow rate compensation signal based upon said digital reference number and further operative to provide an output signal that varies as a function of said temperature feedback signal, said transducer signal, and said flow rate compensation signal; and a valve drive for variably positioning said valve in response to said output signal.

13. The system of claim 12, wherein said predetermined position is substantially closed to substantially block any airflow from passing through said one valve.

14. The system of claim 12, wherein said plurality of airflow sensors are responsive to static and dynamic pressures of said airflow.

15. The system of claim 12, wherein said microcomputer relies on a D/A converter for providing said flow rate compensation signal.

16. The system of claim 12, further comprising a summing amplifier having inputs to receive said transducer signal and said flow rate compensation signal.

17. The system of claim 12, further comprising two A/D converters corresponding to predetermined high and low airflow rates, each of said A/D converters being operative to input said flow rate feedback signal to said microcomputer.

18. A method of controlling a valve in a run mode and in a calibration mode comprising the steps of:

generating a transducer signal that changes in response to changes in flow rate of an airflow through said valve during said run mode and remains substantially constant during said calibration mode;

computing a digital reference number whose value is at least partially based upon said transducer signal that is generated during said calibration mode;

storing said digital reference number;

generating a flow rate compensation signal corresponding to said digital reference number, said compensation signal remaining substantially constant during said run mode;

generating a temperature feedback signal in response to a temperature associated with a comfort zone receiving said airflow; and generating a drive signal that varies as a function of said temperature feedback signal, said transducer signal, and said flow rate compensation signal; and driving said valve to various positions in response to said drive signal.

19. The method of claim 18, further comprising the step of maintaining said valve at a substantially constant predetermined position during said calibration mode.

20. The method of claim 19, wherein said predetermined position is substantially closed to substantially block any airflow form passing through said valve 21. The method of claim 18, further comprising the step of sensing a static and dynamic pressure of said airflow.

22. The method of claim 18, wherein a D/A converter is used to deliver said flow rate compensation signal in discrete incremental steps during said calibration mode.

23. The method of claim 18, further comprising the step of delivering said flow rate compensation signal and said transducer signal to the inputs of a summing amplifier to produce a flow rate feedback signal that generally varies in discrete increments during said calibration mode and varies infinitely during said run mode.

* * * * *